United States Patent [19]
Rosser

[11] Patent Number: 5,400,183
[45] Date of Patent: Mar. 21, 1995

[54] HINDSIGHT VIEWER FOR HUNTERS

[76] Inventor: John L. Rosser, 254 Rupert Cir., Baltimore, Md. 21225-3319

[21] Appl. No.: 260,306

[22] Filed: Jun. 15, 1994

[51] Int. Cl.[6] .......................... G02B 7/18; B60R 1/02
[52] U.S. Cl. .................................... 359/872; 359/881; 248/476; 248/493
[58] Field of Search ............... 359/841, 871, 872, 881; 248/475.1, 476, 489, 493

[56] References Cited

U.S. PATENT DOCUMENTS

| | | | |
|---|---|---|---|
| 1,782,175 | 11/1930 | Pearmain | 359/872 |
| 1,862,094 | 6/1932 | Oishei | 359/872 |
| 3,332,731 | 7/1967 | Penk | 359/872 |
| 3,536,832 | 10/1970 | Zipse et al. | 359/872 |
| 4,487,479 | 12/1984 | Tolomeo, Sr. | 359/881 |
| 4,750,811 | 6/1988 | Beyer | 359/881 |

Primary Examiner—Ricky D. Shafer
Attorney, Agent, or Firm—William F. Hamrock

[57] ABSTRACT

A simple portable rearview mirror apparatus for hunters which can be used on the ground or above the ground by being attached to a tree or other object. The apparatus which can be made of wood, plastic or metal includes a hollow rectangular box frame having opposing side walls attached to a back wall and a top wall. A reflective mirror is hingedly attached at its bottom end within the frame interior to the lower interior of the side walls and is slidably mounted at its top end within opposing swivel slot arch shaped openings provided on the upper side walls surface. The mirror moves back and forth by means of attachments riding within the swivel openings to give a upper and lower view of the background. The apparatus is used at ground level by being supported by a rod inserted into the ground which is secured to a locking element releasably attached to the back wall. A fastening cord which is looped through the apparatus allows it to be tied to an object above the ground such as a tree.

14 Claims, 5 Drawing Sheets

HINDSIGHT VIEWER FOR HUNTERS

BACKGROUND OF THE INVENTION

1. Field of the Invention

The invention relates to a portable rearview mirror apparatus and, more particularly, a portable combined ground and above ground enclosed rearview mirror apparatus for hunters to view the area in the rear for approaching animals.

2. Discussion of the Prior Art

When hunting game animals, such as deer, a hunter usually will take a relatively concealed position in the woods and wait quietly for the animals to appear. The position taken is generally on the ground or in a elevated viewing spot such as up in a tree. In either position, the hunter's body movement must be restricted and remain quiet in order not to scare off approaching animals. The result is that the hunter can only see the animals that appear in the front line of vision and is not aware of what is happening to the rear. Naturally it would be a great benefit to the hunter to have a device which would allow him to view the area to the rear while in either position.

Hunters are known to use mirror devices in order to view the area in back of them while hunting. U.S. Pat. No. 4,750,811 discloses a ground level positioned rear view mirror device open at the sides having a top cover. The device appears to be useable only at ground level and is opened at the sides. U.S. Pat. No. 4,487,479 discloses an above ground positioned rearview mirror device having a central mirror portion and mounted side mirror portions. The device appears to be open on all sides and its central mirror portion appears to have a limited vertical pivoting adjustment.

SUMMARY OF THE INVENTION

There is a need for a simple rearview mirror for hunters that is portable and which is adaptable to for use on the ground but also above the ground such as by being attached to a tree. The mirror portion of the apparatus should be enclosed to prevent reflections not only from the top but also from the sides and thus prevent any reflections which would scare off the animals as well as protecting the mirror portion from the elements. The entire mirror apparatus should be compact and light weight to be easily handled and carried by the hunter. The apparatus should be durable so as to withstand constant manipulation and exposure to the elements. Further, the structure should be so simplified that it can be easily disassembled as required for easy maintenance. Finally, the mirror should be easy to operate and give a wide area of rear view.

The present invention is directed to a simple portable rearview mirror apparatus for hunters which can be used on the ground or above the ground by being attached to a tree or other object. The apparatus which can be made of wood, plastic or metal includes a hollow rectangular box frame having opposing side walls attached to a back wall and a top wall. A reflective mirror is hingedly attached at its bottom end within the frame interior to the lower interior of the side walls and is slidably mounted at its top end within opposing swivel slot arch shaped openings provided on the upper side walls surface. The mirror moves back and forth by means of attachments riding within the swivel openings to give a upper and lower view of the background. The apparatus is used at ground level by being supported by a rod inserted into the ground which is secured to a locking element releasably attached to the back wall. A fastening cord which is looped through the apparatus allows it to be tied to an object above the ground such as a tree.

DESCRIPTION OF THE PREFERRED EMBODIMENT

Figure 1:
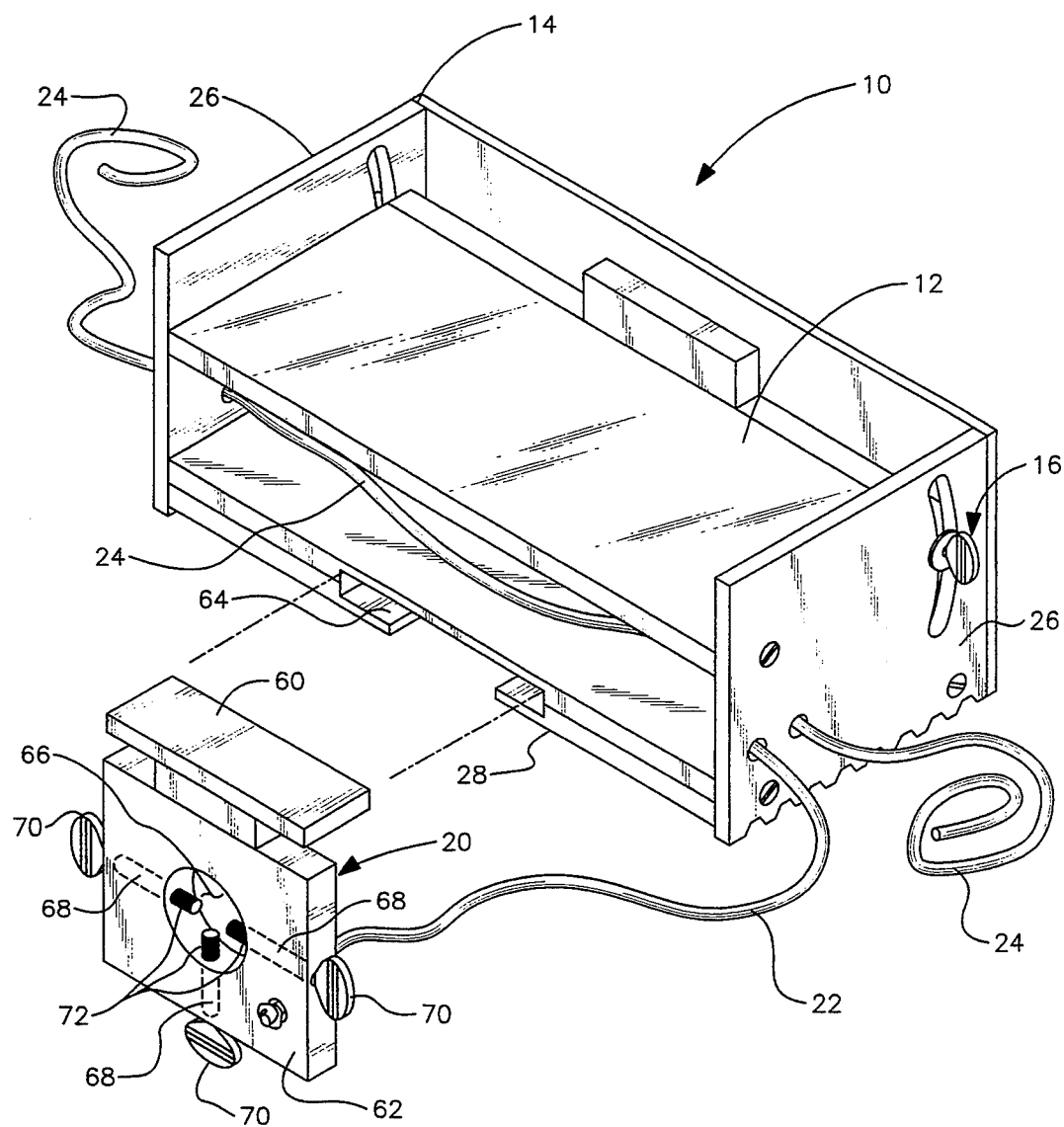
FIG. 1 is a perspective view of the apparatus partly assembled.

Shown in FIG. 1 is an exterior view of mirror apparatus 10 of the invention lieing on its back wall 28. The mirror apparatus as shown includes a reflective mirror 12 facing upwardly slidably mounted within a frame 14 on side walls 26 by a screw attachments 16. Locking element 20 is shown disassembled from seat chamber 64. Locking element 20 is tied to the frame by a linking cord 22 and will be further described below. A fastening cord 24 is looped through the frame and extends outwardly from side walls 26. The frame may be made of wood, metal or plastic and may have a camouflaged surface to blend in with the surroundings.

Figure 2:
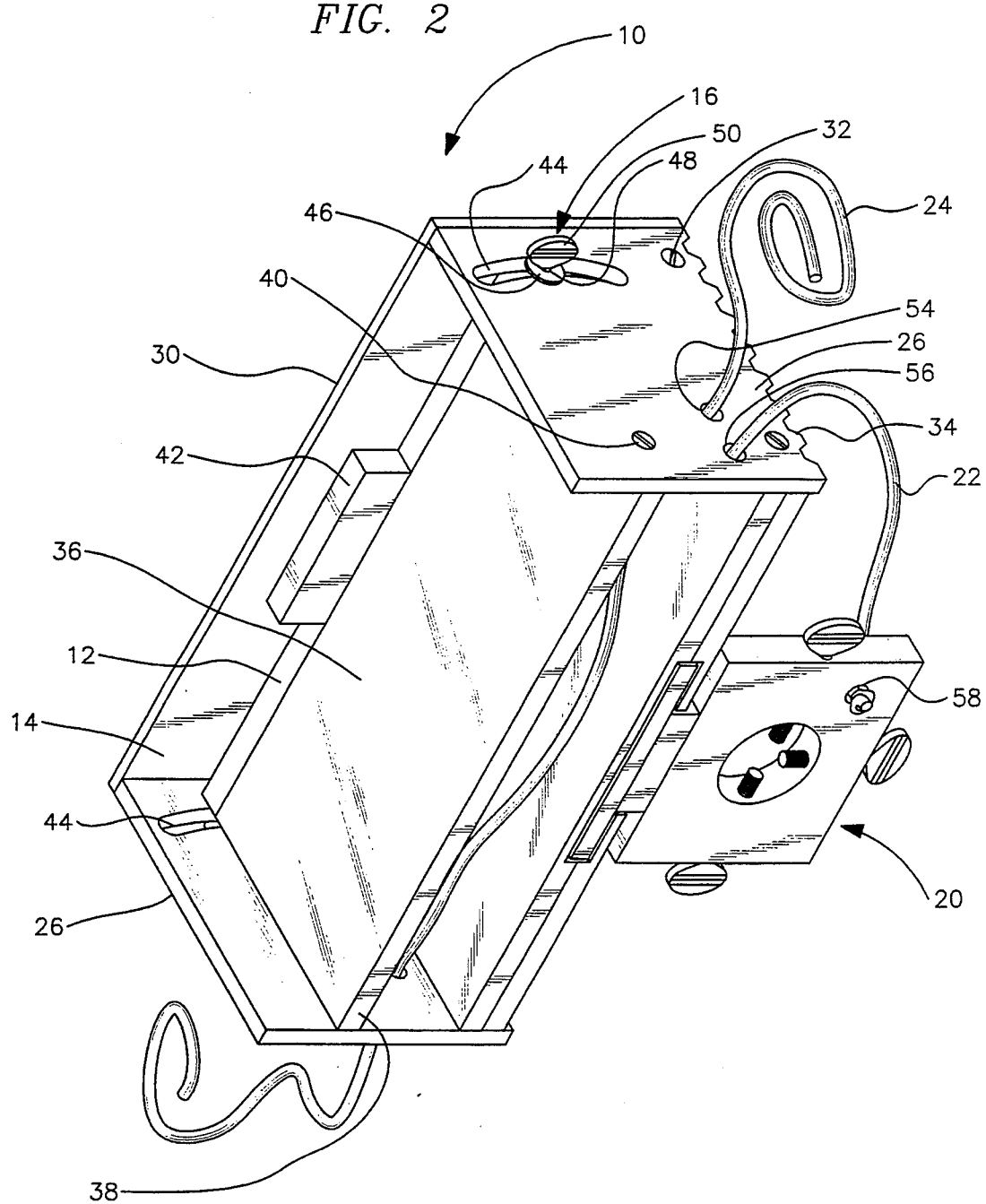
FIG. 2 is a perspective view of the assembled apparatus of the invention.

FIG. 2 is a view of mirror apparatus 10 according to the invention having lock assembly attached to the apparatus. Shown herein is frame 14 having the form of a hollow rectangular box. The frame includes opposing side walls 26 fixedly secured to back wall 28 and top wall 30 by screws 32 but other securing means such as bolts, molding or equivalent securing means may be used. The frame as shown is open at the bottom however it may have a bottom wall if desired. Side walls 26 provide serrated rear edges 34 for improving the grip of the apparatus when attached to an above ground object by fastening cord 24. Reflective mirror 12 provides a reflective mirror surface 36 which may be a reflective mirror of glass, plastic or metal which is laminated or otherwise fixed to a base 38. Reflective mirror 12 is hingedly attached within frame 14 to the lower interior of opposing side walls 26 by screws 40 which hingedly secure mirror base 38 to the lower interior of the side walls. Other types of securing means may be used which would hingedly secure the mirror base to the side walls. An overlapping lip 42 is secured to the central upper portion of the reflective mirror as one means to manipulate the mirror back and forth.

Figure 3:
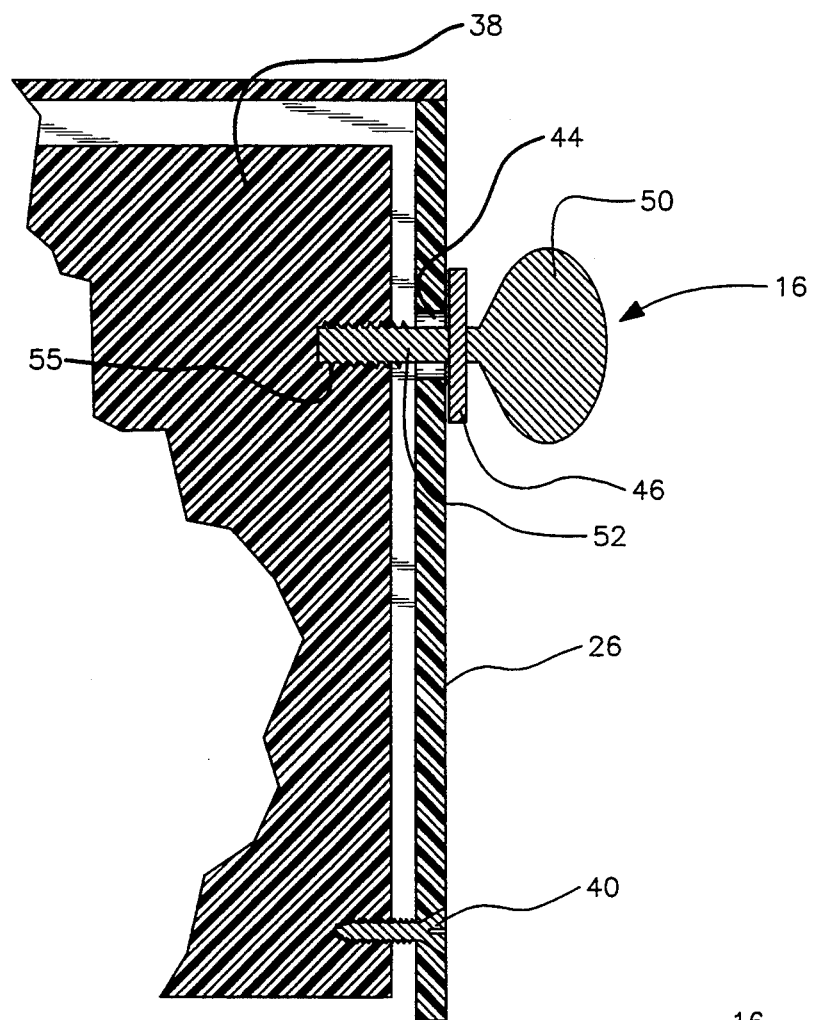
FIG. 3 is a sectional view of the attachment of the reflective mirror.

As seen in FIGS. 1, 2, 3 and 6, each side wall 26 has an opposing swivel slot 44 which provides an arch shaped opening in its upper side wall surface. Slidably mounted within each swivel slot 44 and in movable contact with reflective mirror 12 is screw attachment 16 which includes washer 46 and elongated screw 48 having a winged upper end 50 and an elongated threaded stem 52 extending therefrom. Screw attachment 16 is releasably fixed to reflective mirror 12 by passing elongated threaded stem 52 horizontally through washer 46 contained on the outside of swivel slot 44 and through the swivel slot opening wherein elongated threaded stem 52 is threadedly secured within threaded base cavity 55 in the upper portion of base 38 of the reflective mirror as seen in FIG. 3. Stable positioning of the mirror is by side pressure by tightening the elongated screws 48 by turning the winged upper end 50. Threaded cavity 55 of reflective mirror base 38 is centrally aligned with arch shaped swivel slot 44 opening which is made larger than the diameter of the screw stem whereby elongated threaded stem 52 swings within the open space within the arch shaped opening but does not engage the edges of the swivel slot.

Fastening cord 24 is used to tie the apparatus to a tree or other above ground objects. The fastening cord is looped through opposing apertures 54 positioned on each side wall which directs the fastening cord to pass behind the reflective mirror within frame 14. A second cord, linking cord 22, is secured within one sidewall where it is looped through linking aperture 56 to tie locking element 20 to the frame by being secured within tie locking aperture 58 of the locking element by adhesive, or other securing means. The fastening cord and linking cord may be made of a durable cord material such as nylon or other equivalent durable material.

Figure 4:
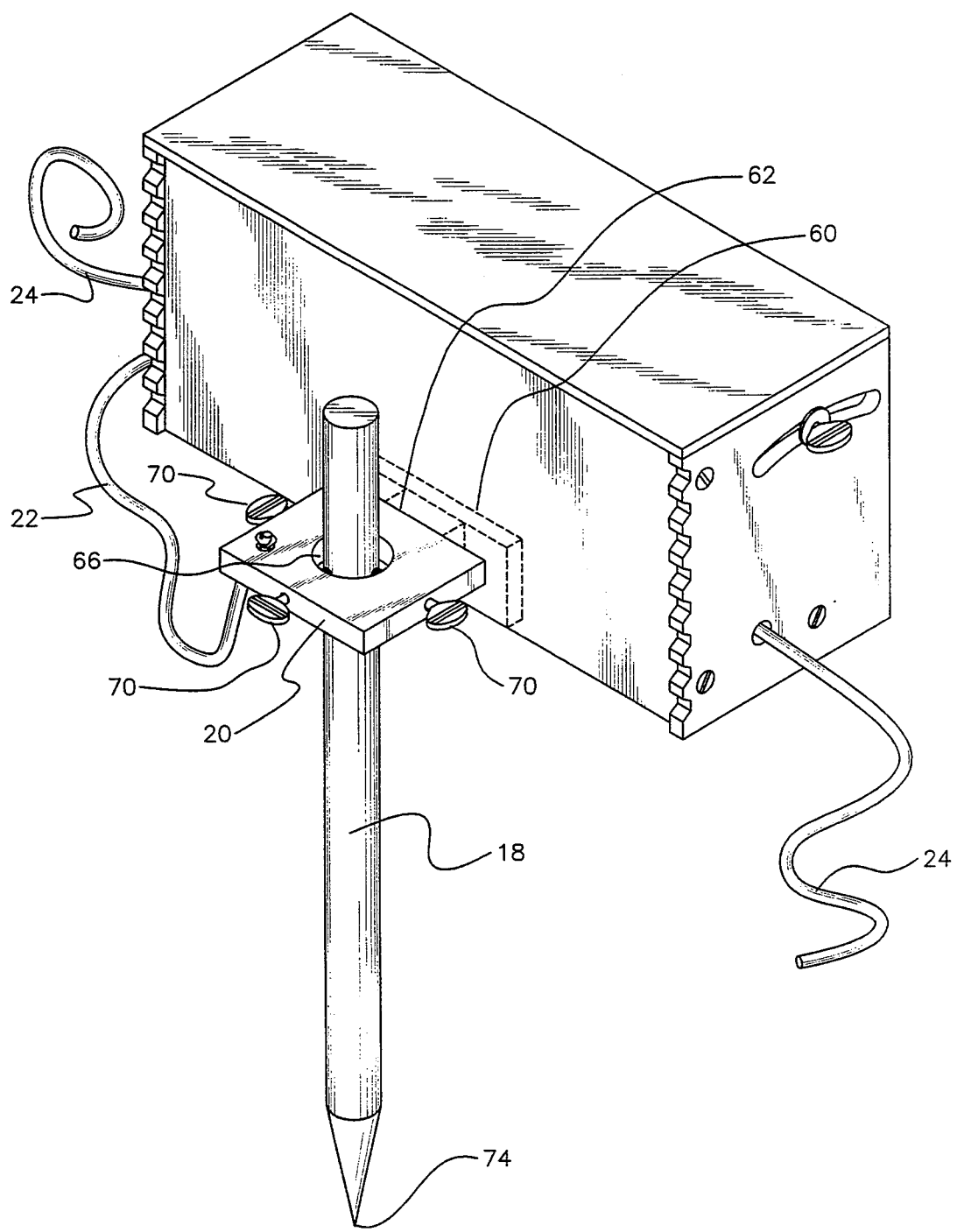
FIG. 4 is a perspective view of the apparatus for placing on the ground.

Locking element 20 as shown in FIGS. 1, 2 and 4 further includes a T-shaped lock 60 integrally joined to the top surface of a substantially square locking block 62. T-shaped lock 60 can be frictionally enclosed within seat chamber 64 provided in the cut-away section in the central lower exterior of back wall 28 whereby square locking block 62 then extends outwardly from the rear of the apparatus in a horizontal position. Locking block 62 includes central orifice 66 and three equidistant threaded locking cavities 68 one each provided on each of the adjacent three sides of the locking block for threaded engagement with threaded locking wing screws 70 providing threaded locking stems 72. The locking stems exit locking cavities 68 to come together within central orifice 66 at about ninety degree angles. The three threaded locking stems 72 coming together at about ninety degrees within central orifice 66 permit ground rod 18 to be mounted to the apparatus as seen in FIG. 4. Ground rod 18 is a separate elongated rod which is releasably locked in place within central orifice 66 by thread locking stems 72 coming together in a tightened position therein. The ground rod has a sharp bottom end 74 which allows it to be more easily inserted into the ground.

Figure 6:
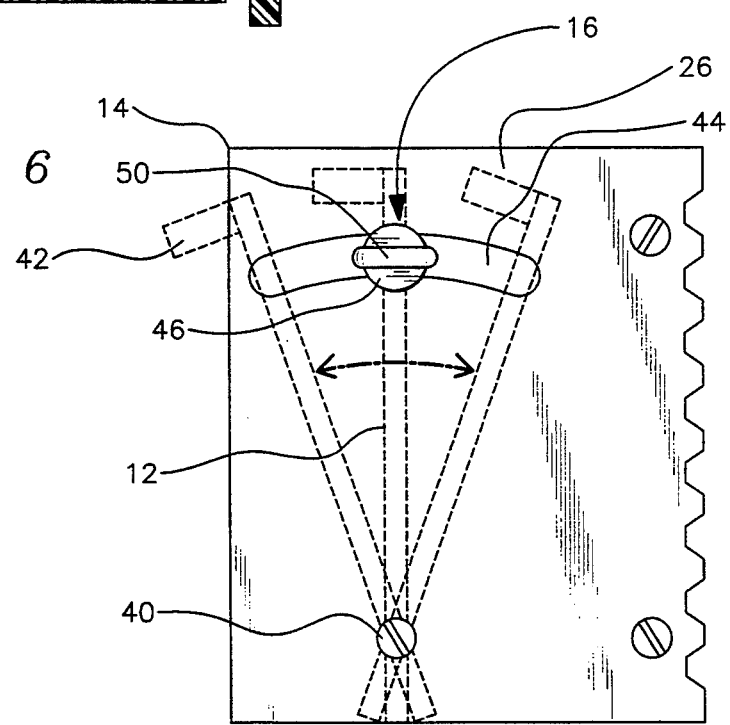
FIG. 6 is a side view of the swivel slot.

FIG. 3 depicts a sectional view and FIG. 6 depicts a side view of reflective mirror 12 set in a vertical plane within frame 14 and hingedly attached to side wall 26 by screw 40. The reflective mirror and screw attachment 16 are subject to back and forth controlled arch shaped swinging movement in alignment with swivel slot 44 as depicted in FIG. 6 to adjust the mirror angle of view about twenty degrees backward and about twenty degrees forward relative to the vertical position of the reflective mirror. This adjustment is accomplished by first loosening the elongated screw by turning winged upper end 50 and then tightening the elongated screw after adjusting the reflective mirror to the angle for rear viewing. The reflective mirror can be moved back and forth by manipulating either overlapping lip 42 shown in FIGS. 1,2, and 6 or the elongated screw winged upper end 50 to the desired position.

As seen in FIGS. 1, 2 and 6, the reflective mirror is completely enclosed within the interior of frame 14 so that the mirror is always protected from the elements. Thus, the present apparatus is a distinct benefit when hunting in bad weather conditions where rain, sleet or snow can have a blinding effect on an unprotected rearview mirror. It is further to be noted that by having the reflective mirror adjustable through the angle range of about forty degrees, this allows the present reflective mirror to be used not only on the ground or in an above ground position but also the mirror gives a wide range of rear view no matter where or how it is used. This is possible because of the arch shaped movement of the reflective mirror within the frame whereby the mirror can be easily adjusted to the wide range of viewing.

Shown in FIG. 4 is how the present apparatus can be supported on the ground by ground rod 18 secured to locking element 20. T-shaped lock 60 of the locking element as seen in FIGS. 1, 2 and 4 is frictionally enclosed within seat chamber 64 where it is held in place by the weight of the apparatus pressing down. Ground rod 18 is seen with its upper end locked within central orifice 66 by threaded locking wing screws 70 and with its lower end to be inserted into the ground. The apparatus can be vertically raised up or lowered, or turned horizontally on the rod by loosening threaded locking wing screws 70. The reflective mirror can then be adjusted to the desired angle of rear view.

Figure 5:
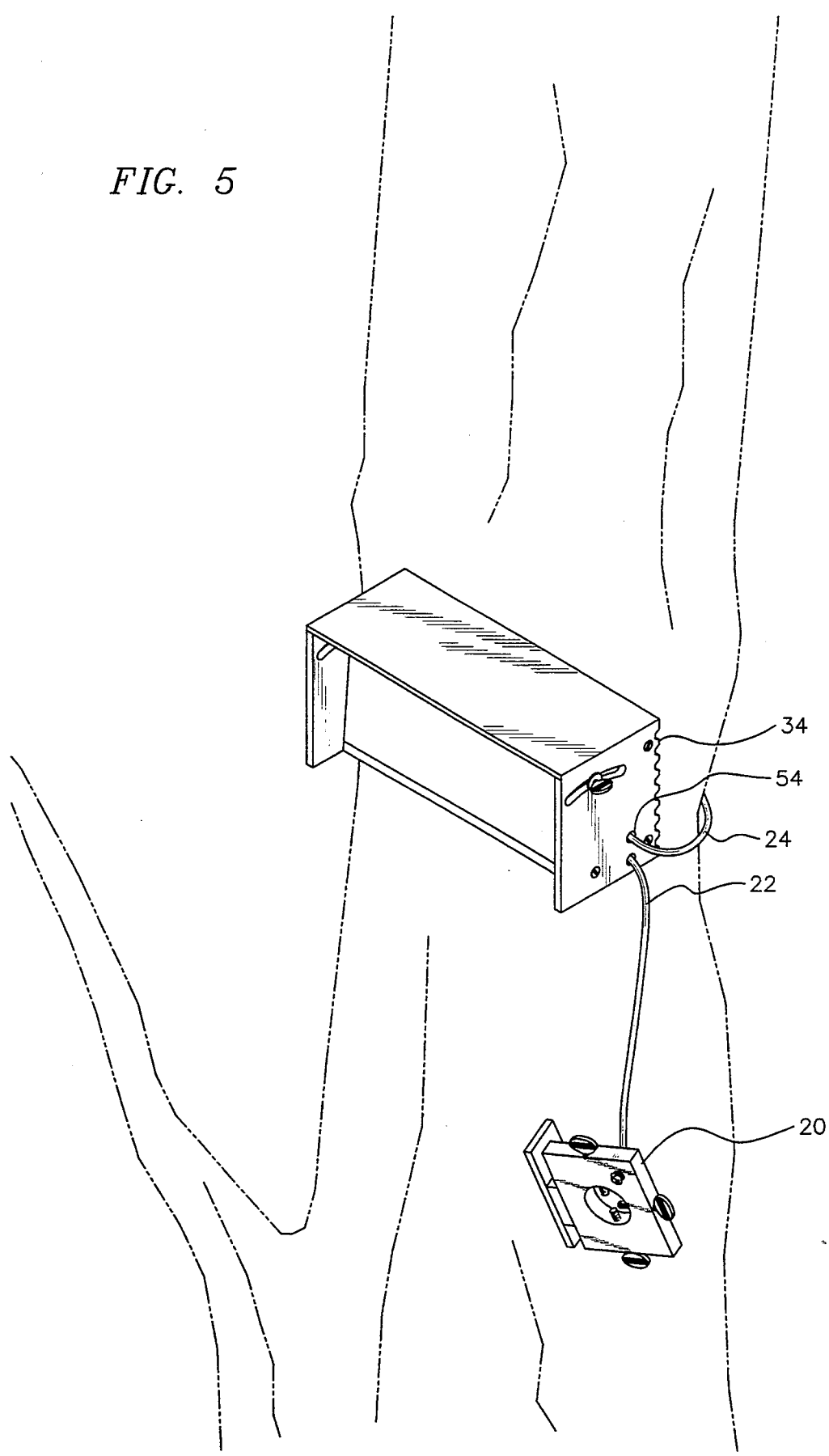
FIG. 5 is a perspective view depicting the apparatus attached to a tree branch.

FIG. 5 depicts the apparatus of the invention being supported on the branch of a tree by fastening cord 24. The fastening cord is seen exiting apertures 54 on the side walls and tied to the tree branch. The serrated rear edges 34 of the side walls are seen wedged into the tree branch for improved grip. The locking element 20 is shown attached to linking cord 22.

There are no limitations for the dimensions of the apparatus. Generally, side walls 14 are about three inches high by two and a half inches wide by one quarter inch thick; top wall 18 is about six and a half by two and a half by one eighth inches; back wall 16 is about six by three by five eighths inches; reflective mirror 20 is about six by three by three eighths inches; locking block 62 is about two by two by one half inches with T-shaped lock 60 being about two by one and an eighth by one eighth inches on the T-stem of about one half of an inch high; and central orifice about one inch in diameter. The length of the swivel slot is about two inches and is cut so that it provides the reflective mirror to move forward and backward about twenty degrees each way from the vertical.

Having now described the invention, it will be apparent to one of ordinary skill in the art that many changes and modifications can be made thereto without departing from the spirit and scope of the invention as set forth herein.

What is claimed is:

1. A portable rearview mirror apparatus comprising a hollow rectangular frame having opposing side walls joined to a top wall and to a back wall wherein each side wall has an opposing arch shaped curved opening,
    a rectangular reflective mirror means for viewing to the rear and enclosed within the frame, said mirror means having a lower surface hingedly mounted to tile side walls and having an upper surface pivotally mounted by securing mounting means within the arch shaped curved opening in the side walls wherein the mounting means restricts back and forth movement which maintains the mirror means within the frame,
    first and second support means attached to said frame for supporting the apparatus in use, said first support means comprises a slot section within the central lower exterior surface of the back wall for frictionally enclosing a locking element support means.

2. The apparatus according to claim 1 wherein the mirror means comprises a reflective mirror mounted on a base plate.

3. The apparatus according to claim 2 wherein said mounting means comprises a screw and washer attachment releasably secured through the arch shaped opening to the upper surface of the mirror base plate.

4. The apparatus according to claim 3 wherein the arch shaped curved opening is large enough to allow restricted back and forth swinging curved movement of the screw and washer attachment and secured mirror means.

5. The apparatus according to claim 4 wherein the back and forth curved movement is for about forty degrees, about twenty degrees on either side relative to the center point of the arch shaped curved opening.

6. The apparatus according to claim 4 wherein the screw and washer attachment includes winged extension protruding on the exterior of the curved opening which can be manipulated to tighten the screw and washer and mirror means in position and to loosen the screw and washer and secured mirror means to move back and forth to a different position.

7. The apparatus according to claim 6 wherein the lower end of the mirror base plate is hingedly secured to the side walls by a screw.

8. The apparatus according to claim 7 wherein an overlapping lip means is attached to the mirror exterior surface as an alternate means of moving the mirror means back and forth.

9. The application according to claim 1 wherein the locking element support means comprises a locking element attached to a locking block wherein the locking element fits within the slot section.

10. The apparatus according to claim 9 wherein the locking block comprises a central orifice locking means for a support rod.

11. The apparatus according to claim 10 wherein the locking means comprises equidistant screws which engage the support rod.

12. The apparatus according to claim 9 the locking element comprises a T-shaped locking element.

13. The apparatus according to claim 1 wherein said second support means comprises a cord secured to the apparatus for releasably mounting the apparatus to an object and the side walls comprise serrated back edges.

14. The apparatus according to claim 13 wherein the object is a tree.

* * * * *